(No Model.)

P. CURRAN.
GAGE.

No. 440,621. Patented Nov. 18, 1890.

Witnesses
Ed. J. Guzman
J. O. Davis

Inventor
Peter Curran
per R. G. Du Bois
his Attorney.

United States Patent Office.

PETER CURRAN, OF SUSQUEHANNA, PENNSYLVANIA.

GAGE.

SPECIFICATION forming part of Letters Patent No. 440,621, dated November 18, 1890.

Application filed February 18, 1890. Serial No. 340,871. (No model.)

*To all whom it may concern:*

Be it known that I, PETER CURRAN, a citizen of the United States, residing at Susquehanna, in the county of Susquehanna and State of Pennsylvania, have invented certain new and useful Improvements in Gages; and I do hereby declare the following to be a full, clear, and exact description of the invention, such as will enable others skilled in the art to which it appertains to make and use the same.

My invention relates to a tire and wheel gage for railroad cars and locomotives, and the object sought to be accomplised is to produce an instrument capable of a greater variety of uses and which will be simple in construction and operation and cheap to manufacture.

With this end in view my invention consists in the peculiarities and combinations more fully set forth hereinafter, and pointed out in the claims.

Figure 1:
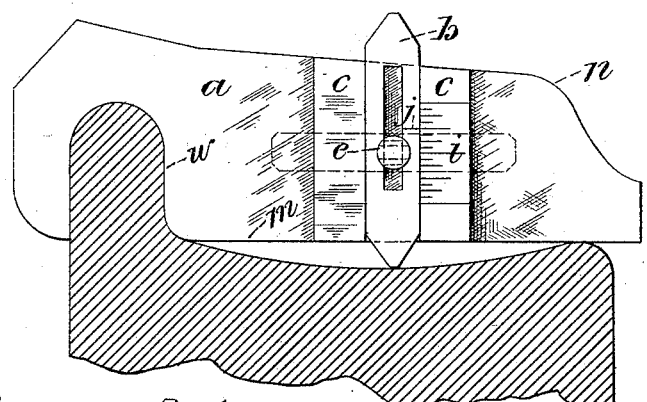
Figure 2:
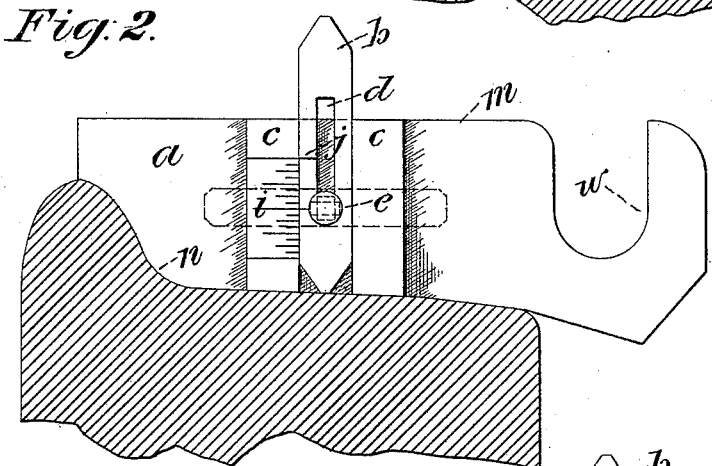
Figure 3:
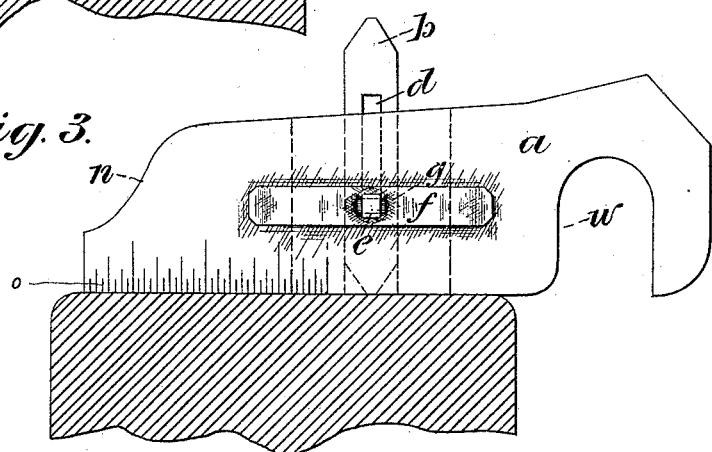
Figure 4:
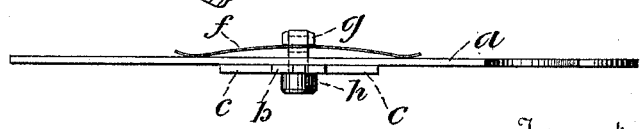

In the accompanying drawings, Figure 1 represents my gage as applied to a worn car-wheel; Fig. 2, as applied to the tire of a locomotive driving-wheel; Fig. 3, to a flangeless or "muley" wheel, and Fig. 4 an edge view.

The body portion of the instrument is represented by the letter *a*, across which is placed in movable adjustment a measuring-slide *b*, which moves back and forth between the guide-plates *c*. This slide is for measuring the depth of hollows or flat spots worn in the tread of the wheels, and it is held in movable adjustment by a locking-bolt *e*, which passes through the body of the gage. The shank of the bolt is secured to a flat retracting-spring *f* by a cross-pin *g*. This spring holds the head *h* snugly against the front face of the slide, and the latter is allowed to move up and down within an elongated slot *d*. This slot is one inch in length, which permits either end of the slide to be projected one inch beyond the opposite gaging-edges of the gage. One of the guide-plates is provided with a scale *i*, representing a subdivided inch, and the slide is provided with a mark *j*, which comes opposite the scale and determines the distance the slide has been extended. In Fig. 1 it is shown extended a quarter of an inch into a badly-worn tire. The edge *n* of the gage is given a contour corresponding to the tire of locomotive driving-wheels and is applied thereto, as shown in Fig. 2, and the opposite edge *m* is made straight for gaging flangeless wheels. This latter side is provided with a flange-recess *w*, with which to gage the wear of the flange.

In using my device it will be seen that the operator can readily gage the tread and flange of an ordinary car-wheel by simply applying it thereto, as shown in Fig. 1. When the gage is thus applied, the operator presses the slide down with the thumb or finger until its lower end bears upon the tread of the wheel. The strength of the spring which draws upon the bolt which holds the slide permits the latter to be easily extended. When thus extended the amount of wear is indicated by the mark *j*.

In applying the gage to a locomotive-tire the end is simply reversed, as in Fig. 2. Hollows or flanges are easily detected in flangeless wheels by applying the gage, as in Fig. 3. The scale *o* upon the straight-edge *m* enables other measurements to be taken. Hence it will be noticed that this gage is applicable to all the wheels upon a train of cars.

Its operation is simple and measurements quickly discernible, and thereby easily recorded.

Having thus described my invention, what I claim as new, and desire to secure by Letters Patent, is—

1. In a gage for railway-vehicles, a gaging-edge consisting of a straight portion fitting the tread of the wheel and a recess to fit the flange, in combination with a measuring-slide arranged at right angles to said edge, and a suitable scale to denote the length of movement of said slide, substantially as described.

2. In a gage for railway-vehicles, a gaging-edge *n*, corresponding to the contour of a locomotive drive-wheel, in combination with a measuring-slide arranged transversely to said edge, and a scale for denoting the length of movement of the slide, substantially as described.

3. In a gage for railway-vehicles, a body portion provided with gaging-edges upon opposite sides thereof, one consisting of a straight portion and a flange-recess and the other corresponding to the contour of a locomotive drive-wheel, in combination with a measuring-slide, the opposite ends of which are adapted to extend beyond both of said edges, and a scale for denoting the length of the movement of said slide, in the manner and for the purpose substantially as described.

In testimony whereof I affix my signature in presence of two witnesses.

PETER CURRAN.

Witnesses:
FRANK CURRAN,
C. F. WRIGHT.